United States Patent [19]

Minds et al.

[11] Patent Number: 5,140,659
[45] Date of Patent: Aug. 18, 1992

[54] COMBINATION OPTICAL FIBER AND ELECTRICAL CONNECTOR

[75] Inventors: Kevin S. Minds, Culver City; Leonard Ellman, Encino, both of Calif.

[73] Assignee: Hughes Aircraft Company, Los Angeles, Calif.

[21] Appl. No.: 646,045

[22] Filed: Apr. 1, 1991

[51] Int. Cl.⁵ ............................ G02B 6/38; F41G 7/00
[52] U.S. Cl. ............................. 385/66; 385/58; 385/101; 385/147; 244/3.12; 244/3.16; 439/577
[58] Field of Search ............. 350/96.10, 96.20, 96.21, 350/96.22, 96.23; 244/3.12, 3.16; 439/577; 385/56, 58, 66, 55, 100, 101, 147, 68

[56] References Cited

U.S. PATENT DOCUMENTS

| | | | |
|---|---|---|---|
| 4,465,333 | 8/1984 | Caserta et al. | 350/96.20 |
| 4,597,631 | 7/1986 | Flores | 350/96.20 |
| 4,678,264 | 7/1987 | Bowen et al. | 350/96.20 |
| 4,767,181 | 8/1988 | McEowen | 350/96.21 |
| 4,869,566 | 9/1989 | Juso et al. | 350/96.20 |
| 4,895,426 | 1/1990 | Pinson | 350/96.23 |
| 4,902,092 | 2/1990 | Grandy | 385/101 |
| 4,943,138 | 7/1990 | Mori | 385/58 |
| 5,005,930 | 4/1991 | Schotter | 350/96.10 |
| 5,066,096 | 11/1991 | Krausse | 385/58 |

*Primary Examiner*—Brian Healy
*Attorney, Agent, or Firm*—R. M. Heald; C. D. Brown; W. K. Denson-Low

[57] ABSTRACT

A combination connector (20) includes a first half connector (22) with a fixed central body (40) and a slidable exterior housing (54) that is biased to a first position, and a second half connector (24) with a fixed exterior housing (70) and a slidable interior body (82) that is biased to a first position. The fixed central body (40) of the first half connector (22) has electrical contacts (42) on its periphery, and the fixed exterior housing (70) has electrical contacts on its interior wall. The slidable exterior housing (54) of the first half connector (22) protects the connection points before the connection is made, and is pushed back to expose the connection points as the two connectors are mated together. The slidable interior body (82) of the second half connector (24) includes a shorting ring (88) that shorts out the electrical contacts (74) of the second half connector (24) before the connection is made, and is pushed back to expose the electrical contacts (74) when the first and second half connectors (22, 24) are mated. One half of a fiber optic cable (48) extends longitudinally through the fixed central body (40) of the first half connector (22), and the other half of the optical cable (80) extends longitudinally through the second half connector (24), and the two are placed into axial contact when the two halves (22, 24) are brought together. The first and second half connectors (22, 24) are dimensioned to ensure registration of the appropriate parts as they are pushed together.

11 Claims, 4 Drawing Sheets

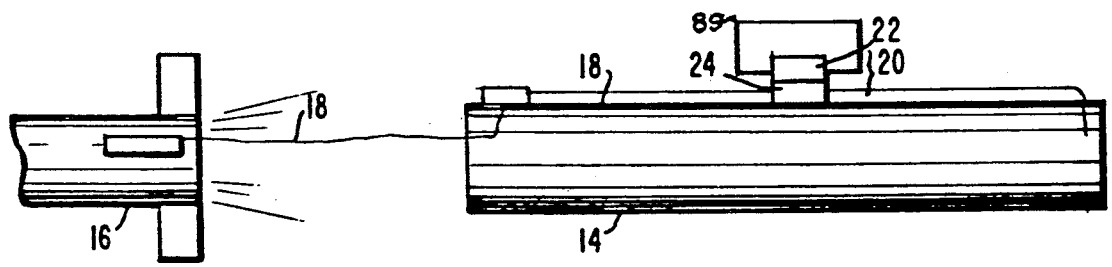
Fig. 2.
Fig. 3.
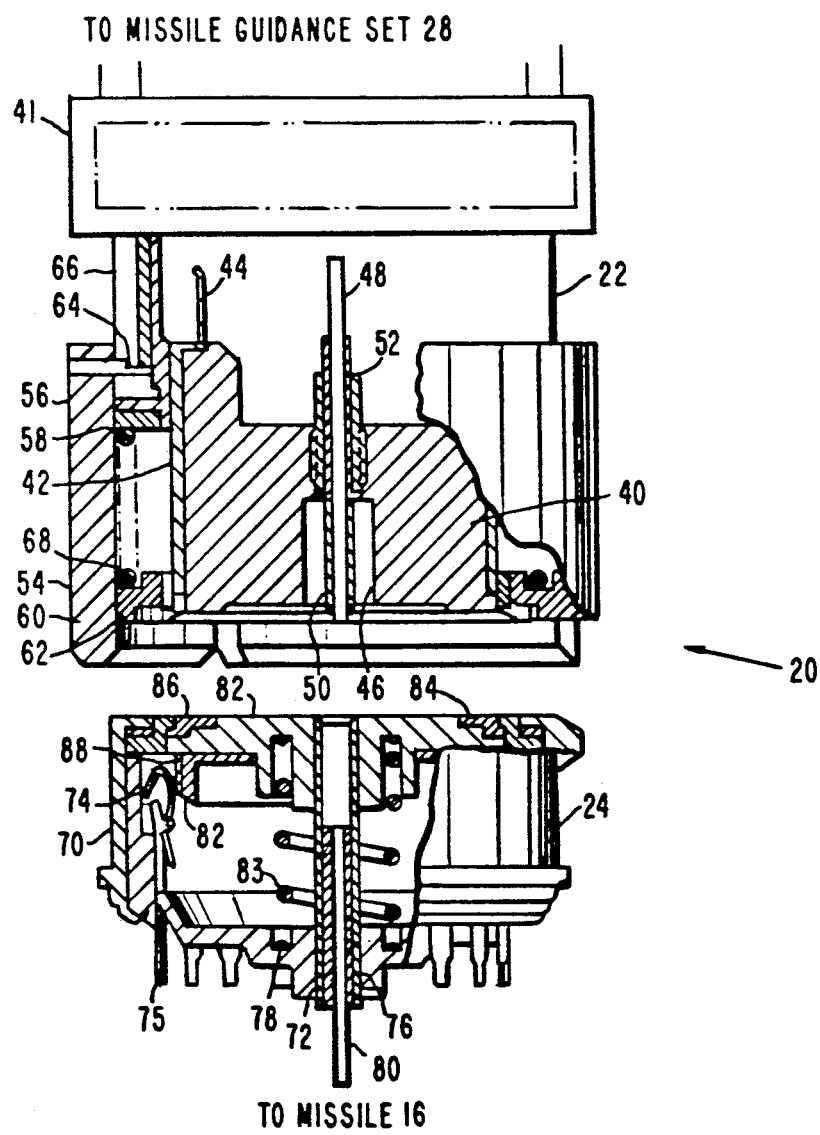

COMBINATION OPTICAL FIBER AND ELECTRICAL CONNECTOR

BACKGROUND OF THE INVENTION

This invention relates to a plug connector for both electrical and fiber optic connections, and, more particularly, to the addition of the fiber optic connections to an existing electrical connector of particular utility in missile systems.

A standard armament used by soldiers is the Tube-launched Optically-tracked Wire guided (TOW) missile. The missile is launched from a disposable missile container, and trails two fine steel wires behind it that are paid out from two internal wire dispensers as the missile flies. The fine wires extend back from the aft end of the missile to the forward end of the missile container. From there a wire harness carries guidance signals through an umbilical connector between the missile container and the launcher to the missile guidance set (MGS). After the missile's mission is completed, the control wires are severed, the umbilical connector halves are separated by a mechanism in the launcher, and the empty missile container is removed from the launcher and discarded. A new missile in its missile container is inserted into the launcher, the halves of the umbilical connector are mated, and the new missile is ready for use.

An important advance in the art of such guided missiles is the use of fiber optical guidance rather than wire guidance links. A fine optical cable containing an optical fiber that transmits light signals is substituted for the electrically conductive guidance signal wires of the TOW missile system, but the system otherwise contains the same basic elements. The optical fiber can transmit larger amounts of information than the wire guidance system, improving the control features of the missile.

With the introduction of optical fiber guided missiles, the soldier in the field will have available both the older wire TOW missile systems and the newer fiber optic guided missile systems. Because the missiles themselves are similar in many respects, it would be desirable to operate both types of missile systems with a common launcher. That is not possible using the existing equipment, because, among other reasons, the connector that is used for the wire guided missile is not compatible with the optical fiber guided missile.

There therefore exists a need, not heretofore recognized, for a connector that is compatible with both types of missile systems. The present invention fulfills this need, and further provides related advantages.

SUMMARY OF THE INVENTION

The present invention provides a missile system that includes a connector compatible with both wire and optical fiber guidance. The connector has both capabilities in a single unit, so that the user of the missile system need not be concerned with separate connectors. The connector protects the active electrical and fiber optic elements both when the connector halves are separated and when they are connected.

In accordance with the invention, a connector that provides both electrical and fiber optic connections comprises a first half connector, including a fixed central body having at least two electrical connector terminals on, and spaced circumferentially around, the periphery thereof; and at least one fiber optic connector extending longitudinally through the fixed central body. In a preferred form the connector further includes a slidable exterior housing that can slide longitudinally along the periphery of the fixed central body, the slidable exterior housing having a first longitudinal position when no connection is made; and first biasing means for biasing the exterior housing to its first longitudinal position.

For mating with the preferred form of the first half connector, the invention provides a second half connector, including a fixed exterior housing having at least two electrical connector terminals on, and spaced circumferentially around, the interior wall thereof, the fixed exterior housing being externally dimensioned to register to the slidable exterior housing of the first half connector and internally dimensioned to register to the periphery of the fixed central body of the first half connector, so that the electrical connector terminals of the first half connector engage the electrical connector terminals of the second half connector when the second half connector is engaged to the first half connector; a slidable interior body that can slide longitudinally along the interior wall of the fixed exterior housing, the interior body having a seal at one end thereof to prevent foreign matter from entering the interior of the second half connector and a peripheral conductive ring for shorting the electrical connector terminals on the interior wall of the fixed exterior housing, when the slidable interior housing is in a first position wherein no connection is made; at least one fiber optic connector extending longitudinally through the fixed central body and disposed to engage the fiber optic connector of the first half connector when the two half connectors are joined; and second biasing means for biasing the slidable interior body toward its first position.

Each of the two half connectors preferably has a fixed portion and a sliding portion. The first half connector has a fixed central body with electrical contacts mounted on the periphery of the central body, and an optical cable extending axially through the central body. The exterior housing of the first half connector slides axially but is biased to a first position. The second half connector has a fixed exterior housing with electrical contacts that engage the electrical contacts on the central body of the first half connector, and which forces the exterior housing of the first half connector rearwardly when the two half connectors are mated. The second half connector further has an axially sliding interior body that is biased to a first position but slides rearwardly when contacted by the fixed central body of the first half connector as the two half connectors are mated. A fixed optical cable extends axially through the center of the slidable interior housing so that it mates with the optical cable in the first half connector.

This arrangement provides a reliable interconnection, for both electrical and optical fiber signals, while protecting the connector halves prior to making the connection. The slidable exterior housing of the first connector half extends axially outwardly past the end of the the fixed central body when it is not connected, thereby protecting the end of the optical cable and the electrical terminals against damage. The slidable interior body of the second connector extends out flush with the end of the connector when the connection is not made, thereby protecting the interior of the fixed external housing, and additionally has a shorting ring to short out the electrical terminals in the second half connector.

The present invention thus provides an advance in the art, permitting the use of common system components for existing wire guided and new optical fiber guided missiles. Other features and advantages of the invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 2 is a side elevational view of the missile system illustrating the electrical interconnections;

FIG. 3 is a side sectional view of the connector of the invention, prior to mating of the two connector halves;

DETAILED DESCRIPTION OF THE INVENTION

In accordance with the invention, a missile system comprises a reusable launch system, including a missile guidance set, a cable across which commands and data are transmitted, and a first half connector, comprising a fixed central body having at least two electrical connector terminals on, and spaced circumferentially around, the periphery thereof, at least one fiber optic connector extending longitudinally through the fixed central body, a slidable exterior housing that can slide longitudinally along the periphery of the fixed central body, the slidable exterior housing having a first longitudinal position when no connection is made, and first biasing means for biasing the exterior housing to its first longitudinal position; and a disposable missile system, including a powered vehicle body, a control cable extending from the missile, and a second half connector, comprising a fixed exterior housing having at least two electrical connector terminals on, and spaced circumferentially around, the interior wall thereof, the fixed exterior housing being externally dimensioned to register to the slidable exterior housing of the first half connector and internally dimensioned to register to the periphery of the fixed central body of the first half connector, so that the electrical connector terminals of the first half connector engage the electrical connector terminals of the second half connector when the second half connector is engaged to the first half connector, a slidable interior body that can slide longitudinally along the interior wall of the fixed exterior housing, the interior body having a seal at one end thereof to prevent foreign matter from entering the interior of the second half connector and a peripheral conductive ring for shorting the electrical connector terminals on the interior wall of the fixed exterior housing, when the slidable interior housing is in a first position wherein no connection is made, at least one fiber optic connector extending longitudinally through the fixed central body and disposed to engage the fiber optic connector of the first half connector when the two half connectors are joined, and second biasing means for biasing the slidable interior body toward its first position.

Figure 1:
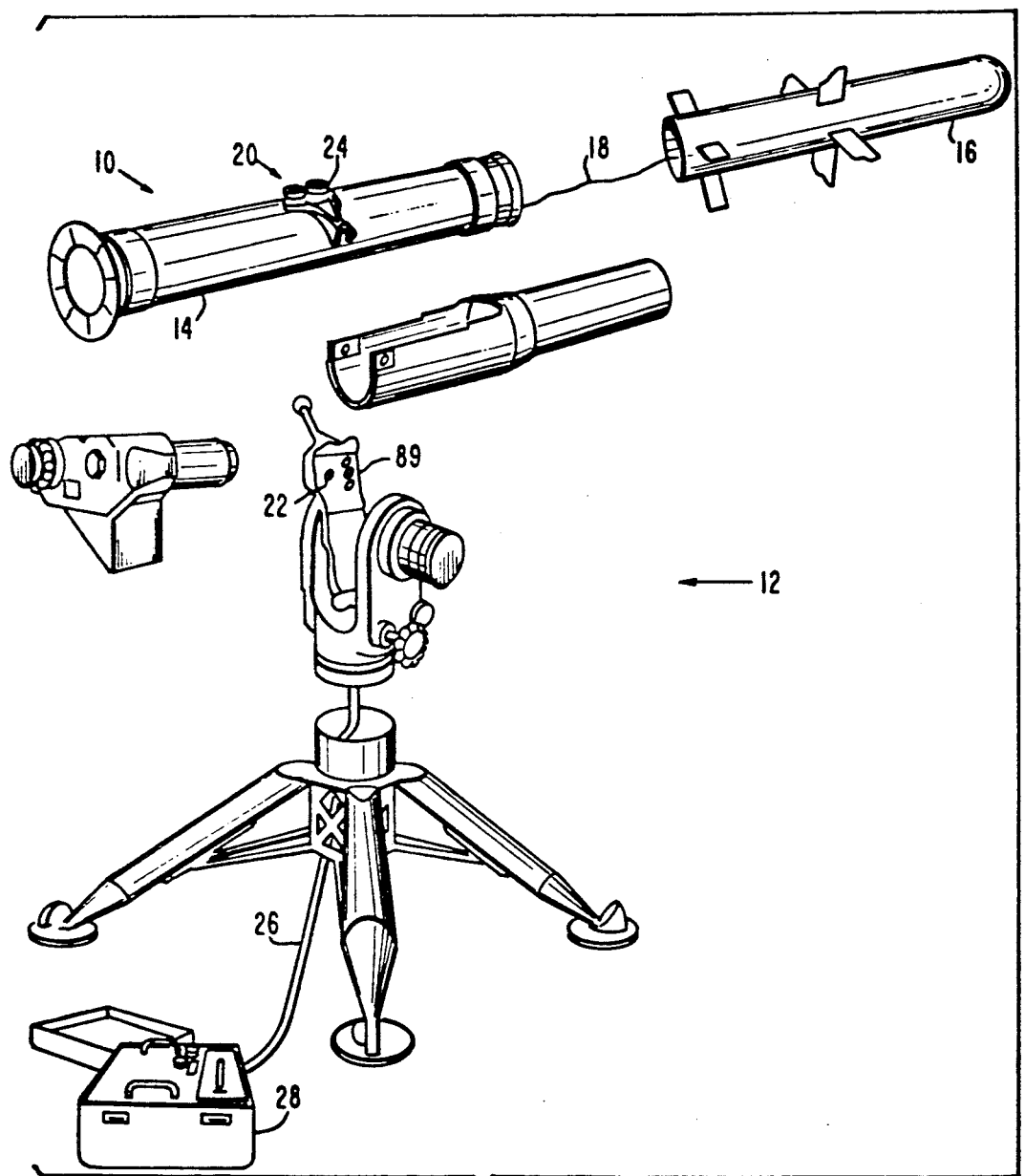
FIG. 1 is a pictorial exploded perspective view of a missile system.

Referring to FIG. 1, a missile system 10 includes a launcher 12, here depicted as having a single missile container 14, but which alternatively can have multiple missile containers. Each missile container 14 initially contains a missile 16, with one such missile depicted in FIG. 1 as having just been launched from the missile container 14. One or two guidance control cables 18 trail behind the missile 16 back to the missile container 14. Each cable or cables 18 may include either an electrical control wire, an optical fiber, or both.

Referring to FIG. 2, the control cable 18 passes out of the missile container 14 through an umbilical connector 20 at a location midway along the length of the missile container 14 and the launcher armament control mechanism 89 of the launcher 12. Returning to FIG. 1, a wiring harness 26 extends from the first half connector to a missile guidance set 28, which sends commands to the missile 16 through the harness 26 and the cable or cables 18, and receives information from the missile along the same data path. The construction of the missile 16, launcher 12, cable 18, harness 26, and missile guidance set 28 are known in the art.

The first half connector 22 remains connected to the harness 26, and thence to the missile guidance set 28, and these components are part of the reusable launch system. The missile container 14 and the second half connector 24, together with the missile 16 and control cable 18, are the disposable pars of the system. (The launcher 12 may be reusable or disposable, depending upon design and construction.)

After the missile 16 has completed its mission, the first half connector 22 is unplugged from the second half connector 24, the empty missile container 14 is removed from the launcher 12, and another missile 16 in a missile container 14 is installed in the launcher 12. The first half connector 22 is plugged into the second half connector 24 of the new missile container 14, permitting the missile guidance set 28 to control the operation of the next missile to be fired.

Figure 4:
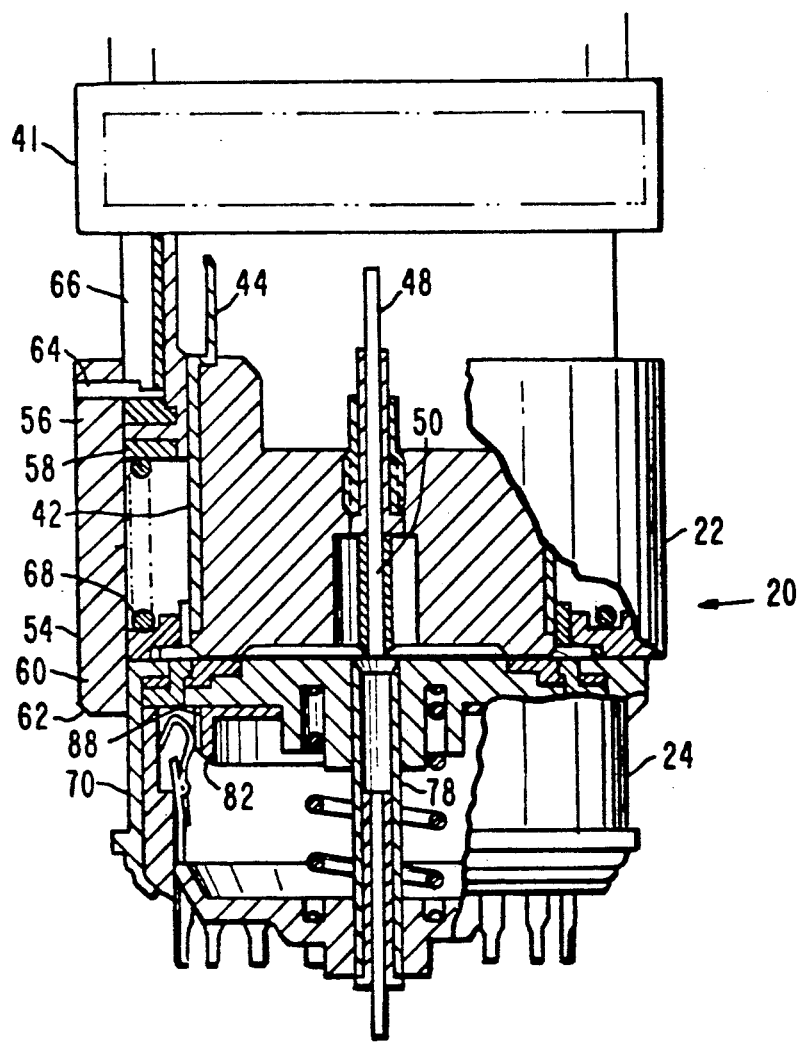
FIG. 4 is a side sectional view of the connector of FIG. 3, with the two connector halves initially engaged.
Figure 5:
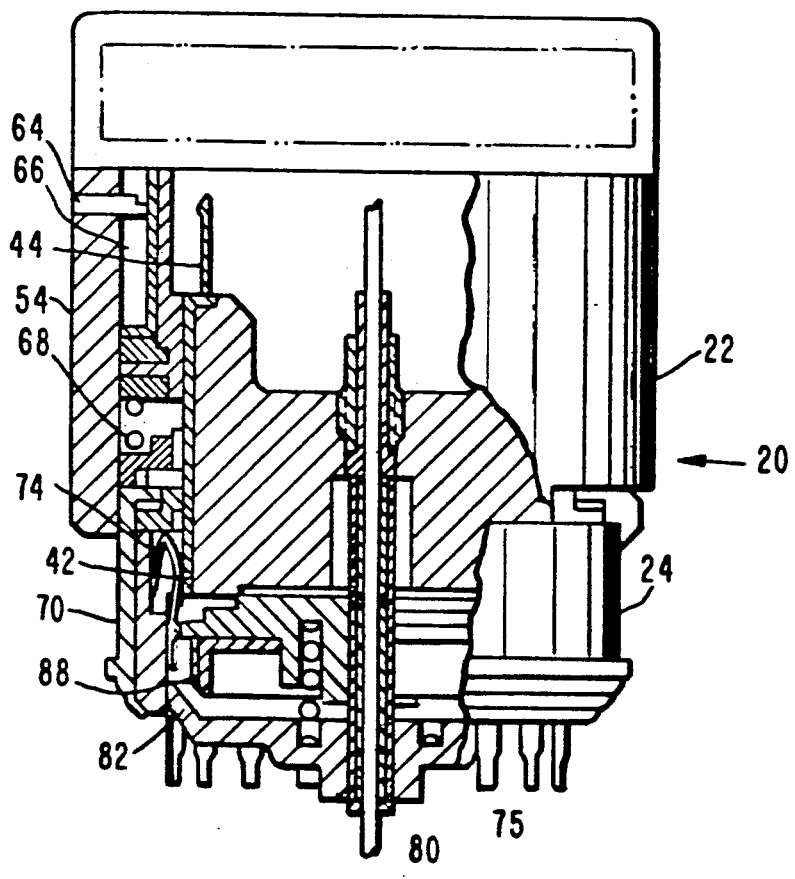
FIG. 5 is a side sectional view of the connector of FIG. 4, with the two connector halves fully engaged.

The construction and operation of the connector 20 are illustrated in FIGS. 3–5, showing the two halves of the connector prior to connection, at initial engagement, and at complete engagement, respectively.

In accordance with this aspect of the invention, a connector that provides both electrical and fiber optic connections comprises a first half connector, comprising a fixed central body having a plurality of electrical bar contacts on, and spaced circumferentially around, the periphery thereof, at least one fiber optic connector extending longitudinally through the fixed central body, the fiber optic connector having a longitudinally extending hollow tube and a fiber optic cable therein, a slidable exterior housing that can slide longitudinally along the periphery of the fixed central body, the slidable exterior housing having a first longitudinal position when no connection is made, keying means for maintaining a preselected angular relationship between the central body and the exterior housing, and first biasing means for biasing the exterior housing toward its first longitudinal position; and a second half connector, comprising a fixed exterior housing having a plurality of electrical spring contacts on, and spaced circumferentially around, the interior wall thereof at angular locations corresponding to those of the bar contacts of the first half connector, the fixed exterior housing being externally dimensioned to register to the slidable exterior housing of the first half connector and internally dimensioned to register to the periphery of the fixed central body of the first half connector, so that the electrical bar contacts of the first half connector engage the electrical spring contacts of the second half connector when the second half connector is engaged to the first half connector, a slidable interior body that can slide longitudinally along the interior wall of the fixed exterior housing, the interior body having a seal at an external end thereof to prevent foreign matter from entering the interior of the second half connector and a peripheral conductive ring for shorting the electrical connector terminals on the interior wall of the fixed exterior housing, when the slidable interior housing is in a first position wherein no connection is made, at least one fiber optic connector extending longitudinally through the fixed central body and disposed to engage the fiber optic connector of the first half connector when the two half connectors are joined, the fiber optic connector of the second half connector including a longitudinally extending tube supported on the fixed exterior housing that receives the longitudinally extending tube of the first half connector therein, and has a fiber optic cable in the center thereof, and second biasing means for biasing the slidable interior body toward its first position.

Referring to FIG. 3, the connector 20 includes the first half connector 22 and the second half connector 24. The first half connector 22 has a fixed central body 40, which in the preferred approach is generally cylindrical in configuration. The fixed central body 40 is fixed with respect to a base 41. The fixed central body 40 is preferably made of an electrically insulating material such as a phenolic resin. A plurality of electrical contacts 42 in the form of flat copper strips are affixed to the fixed central body 40 along its periphery and spaced around its circumference. Electrical connection to the contacts 42 is through a twisted electrical cable 44.

The fixed central body 40 has a bore 46 axially therethrough. An optical cable 48 having an optical fiber within a buffer layer is supported within a hollow cylindrical pin 50, which in turn is fixed within the bore 46 by a ferrule 52. The pin 50 provides lateral and axial support for the optical cable 48 when the connection to the second half connector 24 is made. The optical cable 48 and pin 50 together constitute the fiber optical connector portion of the first half connector 22. The electrical cable 44 and the optical cable 48 together constitute the harness 26.

An exterior housing 54 in the form of a cylindrical sleeve made of a material such as aluminum is slidably supported on the periphery of the fixed central body 40. The inner diameter of the exterior housing 54 is greater than the locus defined by the outer diameter of the electrical contracts 42 to permit room for the electrical connection to the second half connector 24, as will be described subsequently. An upper end 56 of the exterior housing 54 rests against and slides axially over an outwardly extending radial extension 58 of the fixed central body 40. A lower end 60 of the exterior housing 54 has a radially inwardly extending extension 62 that rests against and slides axially over either the fixed central body 40, the electrical contacts 42, or both. These bearing surfaces provide axial stability to the exterior housing 54 as it slides axially with respect to the fixed central body 40. Stability against rotation of the exterior housing 54 relative to the fixed central body 40 is ensured by the engagement of a pin 64 that extends radially inwardly from the exterior housing 54 with a slot 66 on the periphery of the fixed central body 40, which together act to key the exterior housing 54 with the fixed central body 40.

A helical spring 68 is disposed axially between the radial extension 58 of the fixed central body 40 and the radial extension 62 of the exterior housing 54. The spring 68 biases the exterior housing 54 to a first axial position whereat the lower end 60 of the exterior housing 54 extends downwardly to cover and protect the lower end of the fixed central body 40, including the electrical contacts 42, the optical cable 48, and the pin 50. During engagement of the first half connector 22 to the second half connector 24, the engagement pushes the exterior housing 54 back against the spring biasing force to expose the electrical contacts 42, and the pin 50 with the optical cable 48 therein.

The second half connector 24 includes a fixed exterior housing 70 that is fixed relative to a base 72. The fixed exterior housing 70 is disposed and dimensioned such that its outer surface registers with and fits within the inner wall of the exterior housing 54 of the first half connector 22, when the half connectors 22 and 24 are mated together. A plurality of electrical contacts 74 in the form of leaf springs are attached to the interior wall of the fixed exterior housing 70 at circumferential locations corresponding to those of the electrical contacts 42 of the first half connector 22, and these contacts 74 are connected to terminals 75 so that, when the first half connector 22 is mated to the second half connector 24, the electrical contacts 42 engage the electrical contacts 74 to complete the electrical connection between the missile container 14 and the launcher armament control mechanism through the harness 26 to the missile guidance set 28.

The base 72 has an axial bore 76 therethrough. Extending axially through the bore 76 is a pin receiver 78, disposed and dimensioned to receive the pin 64 of the first half connector 22 when the first half connector 22 and the second half connector 24 are mated together. Supported within the pin receiver 78 is an optical cable 80 that is thereby registered axially with the optical cable 48 of the first half connector 22, thereby completing the optical connection between the control cable 18 and the harness 26.

A slidable interior body 82 is disposed and dimensioned to be axially slidable within the fixed exterior housing 70 of the second half connector 24. The periphery of the body 82 contacts and bears against the interior wall of the exterior housing 70, the electrical contacts 74, or both. The slidable interior body 82 is biased to a first position by a helical spring 83 that bears against the base 72 and the slidable interior body 82. In the first position, illustrated in FIG. 3, the slidable interior body 82 seals the end of the second half connector 24 with a circumferential seal 84. A shoulder 86 on the seat of the seal 84 prevents the slidable interior body 82 from being ejected from the second half connector 24 and defines the location of the first position of the slidable interior body 82.

The slidable interior body 82 preferably has a shorting ring 88 that extends around its circumference, at a location such that the shorting ring contacts all of the electrical contacts 74 when the slidable interior body 82 is in its first position. The shorting ring, which is made of an electrical conductor such as copper, performs the important function of shorting all of the electrical lines of the cable 18 that lead to the missile 16, thereby preventing spurious signals (such as static signals) that might inadvertently cause firing of the missile before the first half connector 22 is engaged to the second half connector 24.

The slidable interior body 82 is dimensioned to be of about the same diameter as the fixed central body 40 of the first half connector 22. FIG. 4 illustrates the two connector halves 22 and 24 brought into axial registered alignment. Before the interior of the fixed exterior housing 70 is opened by the unsealing of the seal 84 the external surface of the fixed exterior housing 70 engages the inner surface of the slidable exterior housing 54, preventing entry of contaminants and/or electrical signals into the interior of the connector 20 where the electrical and optical connections are made. As the half connectors 22 and 24 are pushed further together, the fixed central body 40 forces the slidable interior body 82 to slide toward the base 72 against the force of the spring 83. Also as the two half connectors 22 and 24 are pushed further together, FIG. 5, the movement of the slidable interior body 82 moves the shorting ring 88 out of contact with the electrical contacts 74 and permits the contacts 74 to engage the electrical contacts 42 of the first half connector 22. The slidable exterior housing 54 of the first half connector 22 is pushed back by its contact with the fixed exterior housing against the force of the spring 68. At the same time, the pin 64 slides into the pin receiver 78 so that the ends of the optical fibers in the cables 48 and 80 are brought into axial contact so that light can travel from one to the other.

The connector of the present invention provides a reliable mechanism for simultaneously connecting optical fibers and electrical contacts of a cable. The connector protects the sensitive components within the connector halves prior to connection. The connection is readily made and disconnected by a plug-in movement. Although a particular embodiment of the invention has been described in detail for purposes of illustration, various modifications may be made without departing from the spirit and scope of the invention, Accordingly, the invention is not to be limited except as by the appended claims.

What is claimed is:

1. A connector that provides both electrical and fiber optic connections, comprising a first half connector, including
    a fixed central body having at least two electrical connector terminals on, and spaced circumferentially around, the periphery thereof;
    at least one fiber optic connector extending longitudinally through the fixed central body;
    a slidable exterior housing that can slide longitudinally along the periphery of the fixed central body, the slidable exterior housing having a first longitudinal position when no connection is made; and
    first biasing means for biasing the exterior housing to its first longitudinal position.

2. The connector of claim 1, wherein the fiber optic connector is located in the center of the central body.

3. The connector of claim 1, wherein the fiber optic connector includes a hollow pin.

4. The connector of claim 3, wherein the fiber optic connector includes an optical fiber extending through the hollow pin.

5. The connector of claim 1, wherein the central body is cylindrical.

6. The connector of claim 1, further including a second half connector having a second fiber optic connector extending longitudinally therein and disposed to engage the fiber optic connector of the first half connector when the two half connectors are joined.

7. The connector of claim 6, wherein the fiber optic connector of the first half connector includes a hollow pin with an optical fiber extending through the hollow pin.

8. The connector of claim 7, wherein the fiber optic connector of the second half connector includes a pin receiver dimensioned and disposed to receive the hollow pin of the first half connector, and further includes an optical fiber extending through the pin receiver.

9. The connnector of claim 1, further comprising a second half connector, including
    a fixed exterior housing having at least two electrical connector terminals on, and spaced circumferentially around, the interior wall thereof, the fixed exterior housing being externally dimensioned to register to the slidable exterior housing of the first half connector and internally dimensioned to register to the periphery of the fixed central body of the first half connector, so that the electrical connector terminals of the first half connector engage the electrical connector terminals of the second half connector when the second half connector is engaged to the first half connector;
    a slidable interior body that can slide longitudinally along the interior wall of the fixed exterior housing, the interior body having a seal at one end thereof to prevent foreign matter from entering the interior of the second half connector and a peripheral conductive ring for shorting the electrical connector terminals on the interior wall of the fixed exterior housing, when the slidable interior housing is in a first position wherein no connection is made;
    at least one fiber optic connector extending longitudinally through the fixed central body and disposed to engage the fiber optic connector of the first half connector when the two half connectors are joined; and
    second biasing means for biasing the slidable interior body toward its first position.

10. A connector that provides both electrical and fiber optic connections, comprising:
    a first half connector, comprising
        a fixed central body having a plurality of electrical bar contacts on, and spaced circumferentially around, the periphery thereof,
        at least one fiber optic connector extending longitudinally through the fixed central body, the fiber optic connector having a longitudinally extending hollow tube and a fiber optic cable therein,
        a slidable exterior housing that can slide longitudinally along the periphery of the fixed central body, the slidable exterior housing having a first longitudinal position when no connection is made,
        keying means for maintaining a preselected angular relationship between the central body and the exterior housing, and
        first biasing means for biasing the exterior housing toward its first longitudinal position; and
    a second half connector, comprising
        a fixed exterior housing having a plurality of electrical spring contacts on, and spaced circumferentially around, the interior wall thereof at angular locations corresponding to those of the bar contacts of the first half connector, the fixed exterior housing being externally dimensioned to register to the slidable exterior housing of the first half connector and internally dimensioned to register to the periphery of the fixed central body of the first half connector, so that the electrical bar contacts of the first half connector engage the electrical spring contacts of the second half connector when the second half connector is engaged to the first half connector, a slidable interior body that can slide longitudinally along the interior wall of the fixed exterior housing, the interior body having a seal at an external end thereof to prevent foreign matter from entering the interior of the second half connector and a peripheral conductive ring for shorting the electrical connector terminals on the interior wall of the fixed exterior housing, when the slidable interior housing is in a first position wherein no connection is made, at least one fiber optic connector extending longitudinally through the fixed central body and disposed to engage the fiber optic connector of the first half connector when the two half connectors are joined, the fiber optic connector of the second half connector including a longitudinally extending tube supported on the fixed exterior housing that receives the longitudinally extending tube of the first half connector therein, and has a fiber optic cable in the center thereof, and second biasing means for biasing the slidable interior body toward its first position.

11. A missile system, comprising:

a reusable launch system, including a missile guidance set, a cable across which commands and data are transmitted, and a first half connector, comprising a fixed central body having at least two electrical connector terminals on, and spaced circumferentially around, the periphery thereof, at least one fiber optic connector extending longitudinally through the fixed central body, a slidable exterior housing that can slide longitudinally along the periphery of the fixed central body, the slidable exterior housing having a first longitudinal position when no connection is made, and first biasing means for biasing the exterior housing to its first longitudinal position; and a disposable missile system, including a powered vehicle body, a control cable extending from the missile, and a second half connector, comprising a fixed exterior housing having at least two electrical connector terminals on, and spaced circumferentially around, the interior wall thereof, the fixed exterior housing being externally dimensioned to register to the slidable exterior housing of the first half connector and internally dimensioned to register to the periphery of the fixed central body of the first half connector, so that the electrical connector terminals of the first half connector engage the electrical connector terminals of the second half connector when the second half connector is engaged to the first half connector, a slidable interior body that can slide longitudinally along the interior wall of the fixed exterior housing, the interior body having a seal at one end thereof to prevent foreign matter from entering the interior of the second half connector and a peripheral conductive ring for shorting the electrical connector terminals on the interior wall of the fixed exterior housing, when the slidable interior housing is in a first position wherein no connection is made, at least one fiber optic connector extending longitudinally through the fixed central body and disposed to engage the fiber optic connector of the first half connector when the two half connectors are joined, and second biasing means for biasing the slidable interior body toward its first position.

* * * * *